May 1, 1962 W. H. BROWN 3,032,123

DIGGER FOR TREES AND SHRUBS

Filed May 26, 1958 9 Sheets-Sheet 1

FIG. I

INVENTOR.
WESLEY H. BROWN
BY Gordon C. Clark
ATTORNEY

May 1, 1962 W. H. BROWN 3,032,123
DIGGER FOR TREES AND SHRUBS
Filed May 26, 1958 9 Sheets-Sheet 2

INVENTOR.
WESLEY H. BROWN
BY [signature]
ATTORNEY

May 1, 1962 W. H. BROWN 3,032,123

DIGGER FOR TREES AND SHRUBS

Filed May 26, 1958 9 Sheets-Sheet 3

INVENTOR.
WESLEY H. BROWN
BY Gordon C. Clark
ATTORNEY

INVENTOR.
WESLEY H. BROWN
BY Gordon C. Mack
ATTORNEY

DIGGER FOR TREES AND SHRUBS

Filed May 26, 1958 9 Sheets-Sheet 5

INVENTOR.
WESLEY H. BROWN

BY Gordon C. Clark

ATTORNEY

FIG. 6
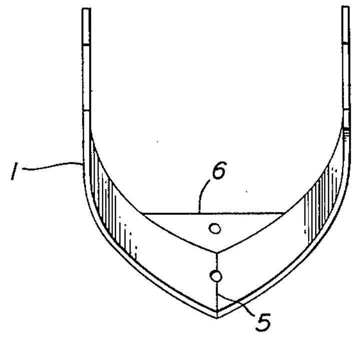
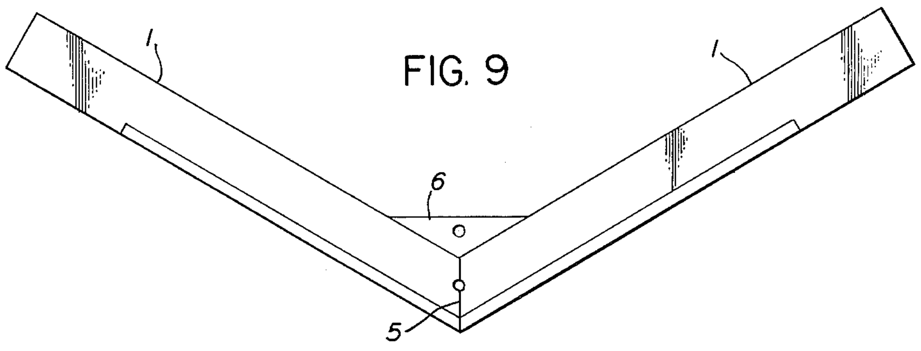
FIG. 9
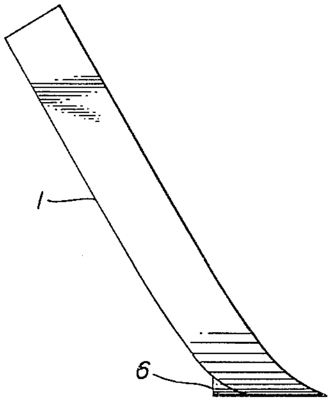
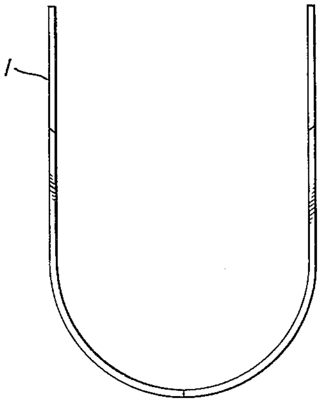
FIG. 8
FIG. 7
INVENTOR.
WESLEY H. BROWN
BY Jordon C. Clark
ATTORNEY INVENTOR.
WESLEY H. BROWN
BY [signature]
ATTORNEY May 1, 1962 W. H. BROWN 3,032,123

DIGGER FOR TREES AND SHRUBS

Filed May 26, 1958 9 Sheets-Sheet 8

INVENTOR.
WESLEY H. BROWN
BY Gordon C. Clark
ATTORNEY

May 1, 1962 W. H. BROWN 3,032,123
DIGGER FOR TREES AND SHRUBS
Filed May 26, 1958 9 Sheets-Sheet 9
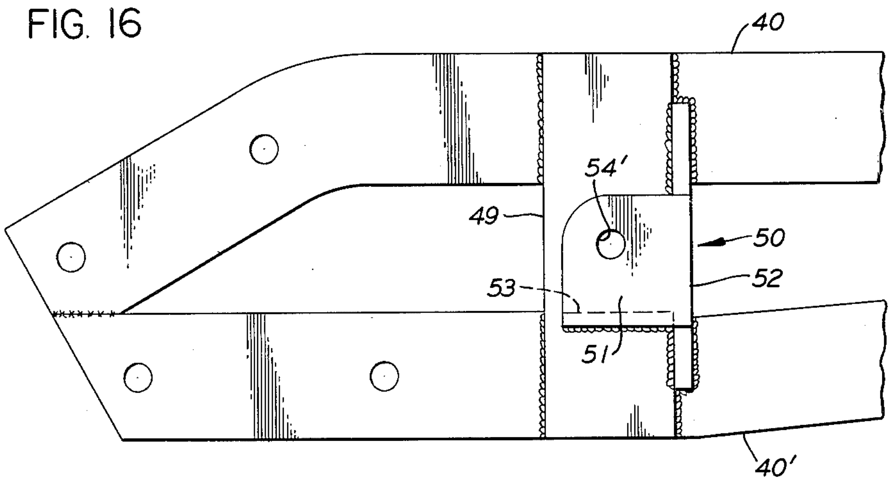
FIG. 18
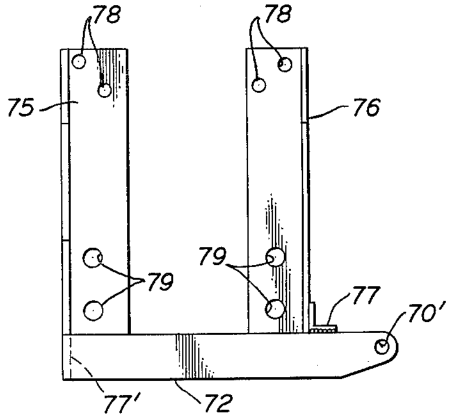
FIG. 17
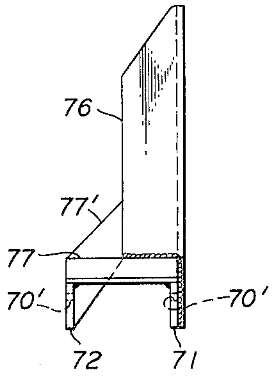
INVENTOR.
WESLEY H. BROWN
BY Gordon C. Mack
ATTORNEY United States Patent Office 3,032,123
Patented May 1, 1962

3,032,123
DIGGER FOR TREES AND SHRUBS

Wesley H. Brown, Biddle Heights, Knoxville, Tenn.
Filed May 26, 1958, Ser. No. 737,558
6 Claims. (Cl. 172—448)

This invention relates to a digger for nursery stock, i.e., young trees and shrubs.

The digger may be used to cut off the bottoms of the tap roots of a row of trees or shrubs which have grown down into the hard pan under the top soil. These are not necessary to the growth of the tree or shrub, and if left intact would require a very deep hole for the tree or shrub at its new location. In the case of shrubbery, this root cutting is often called root pruning, and is customarily done several months before the plants are removed from the ground. In the case of trees, it is customarily done at the time of transplanting. Even though the stock is not to be transplanted until a later season, the digger may be run under a row of the trees or shrubs to loosen the soil and permit the moisture to have access to the roots; and this is usually done in the fall.

The digger of this invention is attached to a tractor—not pulled by one. The tractor must be a high clearance tractor. The invention will be described particularly in connection with a three-wheeled tractor with a single digger mounted to operate behind the rear axle and midway between the paths of the single front wheel and one of the side wheels, although it is conceivable that two diggers may be attached to a tractor of this type—one on each side. Also, one or more diggers may be suitably attached to a four-wheeled tractor.

The invention relates more particularly to an improved cutting blade, its mounting and operating mechanism and its method of cutting. The blade is of substantially uniform thickness—except that the front edge is sharp—and it is generally U-shaped except that the bottom of the U is tilted forward with respect to the ends which are directed upwardly—opposite one another. The blade is designed to go through the soil with the bottom horizontal or parallel with the ground surface from front to back, and it is pushed through the soil by the turned up ends of the U which slant up backwardly. By "horizontal" it is not meant that the bottom of the U is flattened, but that viewed from the side, the bottom of the U is horizontal.

As the blade is pushed through the soil, it is preferably free to tilt up or down and consequently "floats," and maintains a position parallel to the ground surface.

The blade is thin and pointed at the middle of the bottom. The front edges slope smoothly outwardly, upwardly and backwardly on both sides of this point and as the blade is pushed through the soil this front edge fends rocks, large roots, etc. to one side or the other or slides them to the ground surface.

The blade is preferably thin, and advantageously is made of two sheets of steel, welded together along their bias-cut ends to form the pointed middle. The cutter mounting and mechanism not only maintain the cutting blade in proper cutting position in relation to the tractor during the cutting operation, but also enter the blade into the ground with a decided downward angle to reduce the horizontal distance required to attain the depth of cut as selected by the operator.

The invention will be described more particularly in connection with a digger attached to a three-wheeled tractor, and its use in cutting young trees planted in straight parallel rows, which may be approximately 40 inches apart. The rear tractor wheels will then be about 80 inches apart and will straddle two rows of the young trees. The front wheel of the tractor will travel between these two straddled rows. The tractor is a high clearance tractor. If necessary, it will be provided on each side with a chute of cloth or other suitable material to bend over the tops of the trees so that the tractor will pass over them without doing any damage to them.

The invention will be further described in connection with the accompanying drawings, in which—

FIG. 6 is a view of the blade, as seen from above;

FIG. 7 is a side view of the blade;

FIG. 8 is a front view of the blade;

FIG. 9 is a plan view of the blade before bending to finished shape;

FIG. 16 is a detail from the right beam showing bracket for attaching to arch;

FIG. 17 is a detail of the front of the bracket attaching the outer draft link to the tractor wheel drive housing;

FIG. 18 is a detail showing a side elevation of the outer draft link bracket;

Although the drawings illustrate a digger attached to the right side of a tractor, it is apparent that it can be made for attachment to the left side. With few changes, a digger can be attached to both sides. In a three-wheeled tractor the digger or diggers are located to the rear of the portion with the highest clearance, i.e. between the rear wheel and the body of the tractor. If chutes are used, and they are recommended, they may be mere canvas covers on suitably arched frames attached to the tractor, which slope down toward the rear so that they gradually bend the trees under the axle of the fractor or other point of lowest clearance.

The blade 1 has sufficient lateral flexibility to slightly cushion shocks resulting from striking rocks, etc., and is bent to a U-shape with the bottom of a desired radius. To prevent variation of the radius while the digger is in use, the side mountings are held constant by the rigid lifting arch 2, which is preferably of flat steel shaped and welded to form a hollow member of rectangular cross section. It provides spaced arms 3 and 4 of relatively invariable width. The center of the arch is high enough to clear the trees when bent over by the chutes, if used, or the padded undersurface of the tractor axle.

Figure 1:
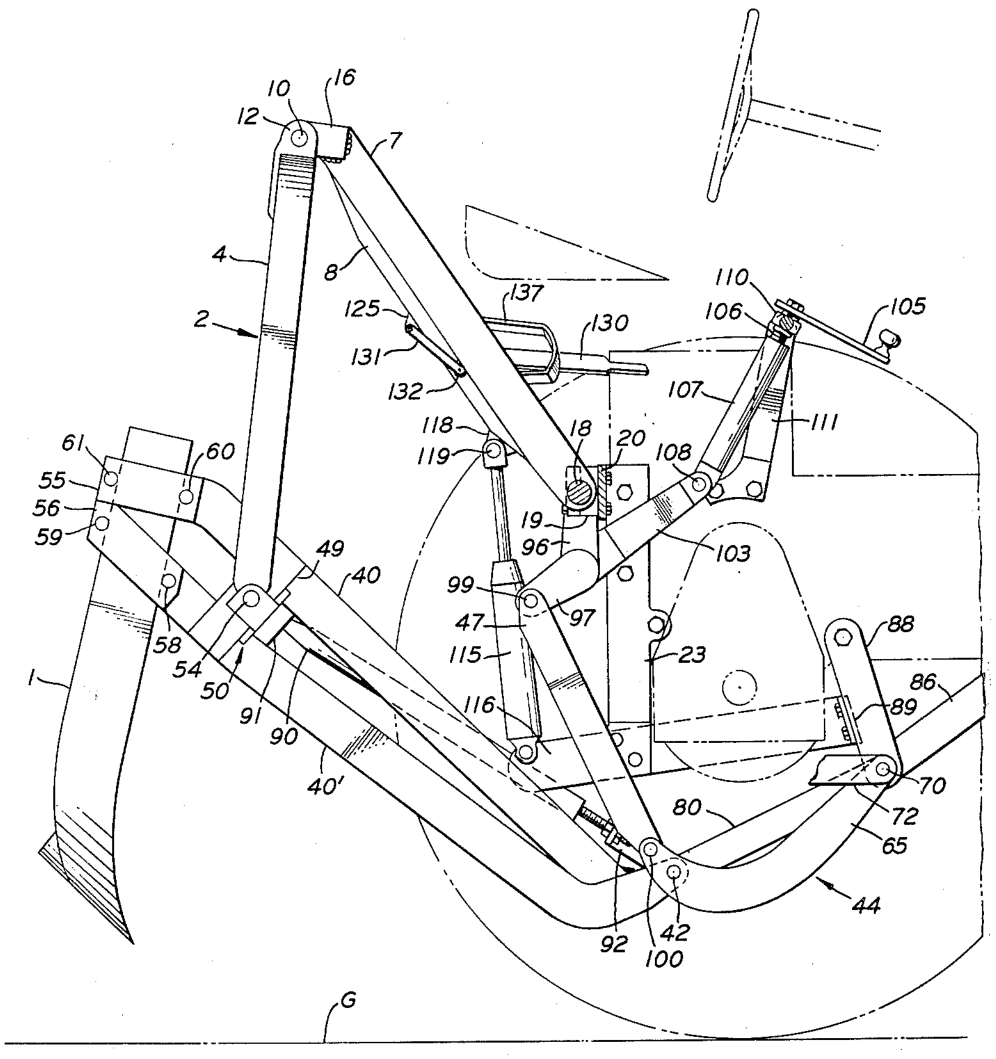
FIG. 1 is a side view of the digger mounted on the right side of a tractor, the blade raised for transporting, and with the right wheel and attaching brackets removed to better show the arrangement of parts.
Figure 2:
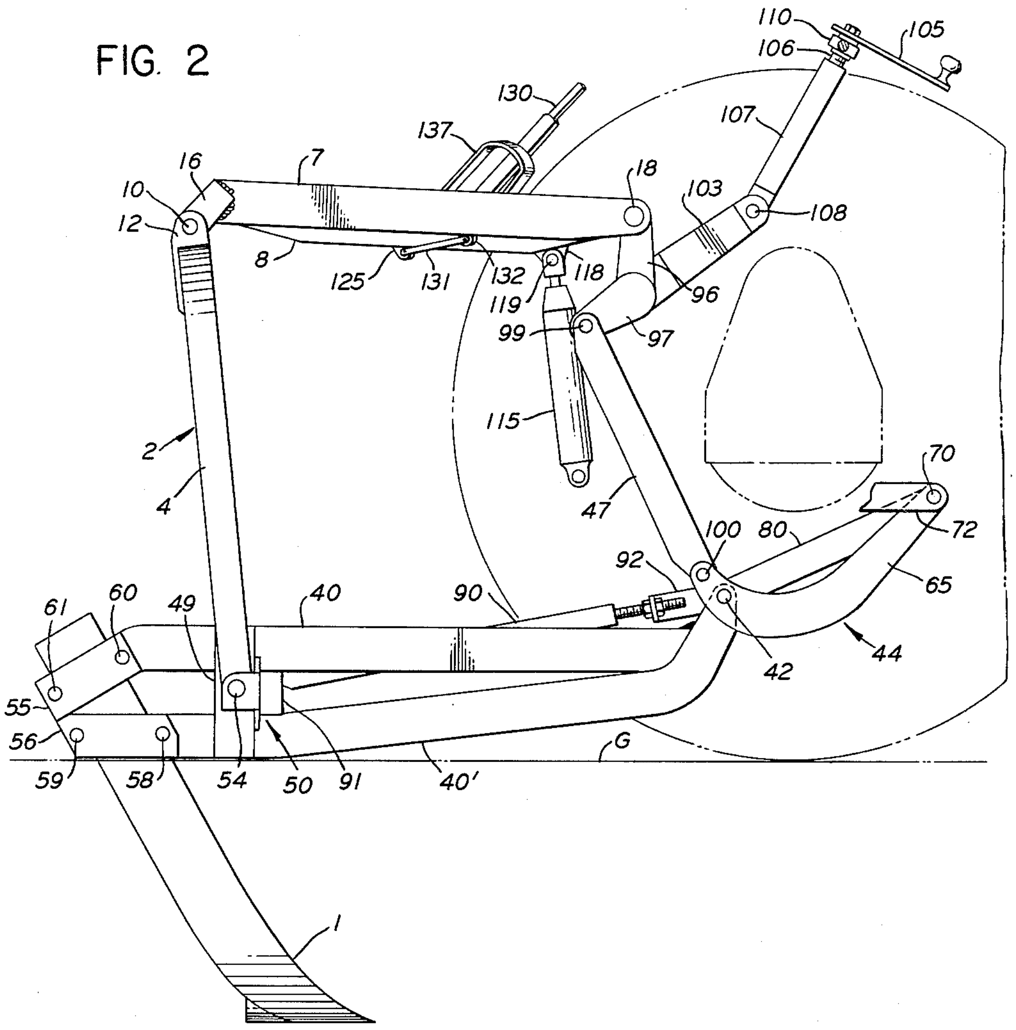
FIG. 2 is a side view, with the blade lowered to its deep cutting position.
Figure 3:
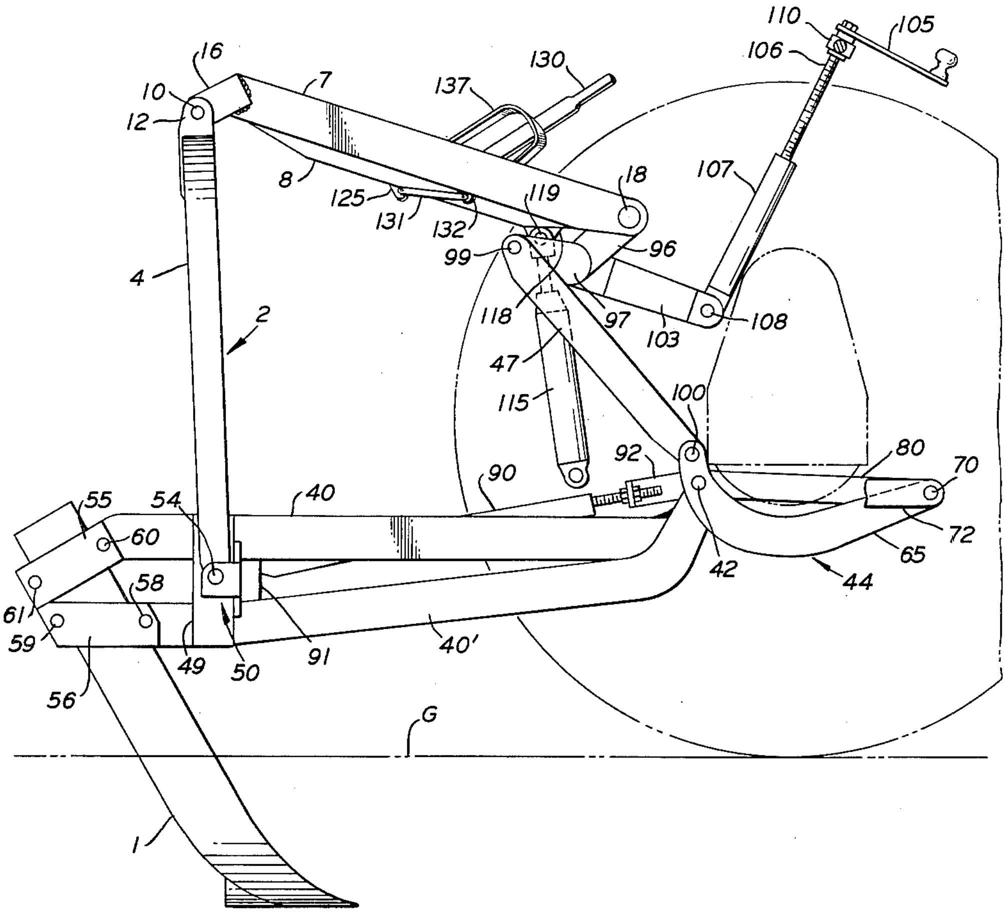
FIG. 3 is another side view, with the blade adjusted for a shallow cut.

It is apparent from FIG. 6 that the blade 1 is pointed, and FIG. 1 shows the blade approaching the ground with its bottom at an angle. However, within the ground the bottom of the blade is paralel to the ground surface. (FIG. 2, 3 and 7.) The front view of the blade (FIG. 8) also shows its bottom parallel to the ground surface, and also indicates its small cross-sectional area and that the least possible amount of earth is displaced by it when it travels through the soil in this position.

The blade is preferably made from two sheets of tool steel which are welded together at 5. FIGURE 9 shows the continuous uninterrupted beveled front-edge of the blade which extends backwardly from each side of the pointed center. This is also shown in FIG. 7 and in FIGS. 1, 2 and 3. The welded center line of the blade is reinforced by the plate 6. The reinforcement increases the length of the horizontal contact of the blade with the ground and thus stabilizes the blade at the depth selected by the operator. Holes are provided for attaching so-called boosters or sloping metal straps which are commonly used with U-shaped blades to slightly raise the trees when they are to be removed from the ground immediately after cutting.

There are no changes of angle or offsets or sharp bends in the front of the blade which is its cutting edge, so any stones, large roots or other objects which may be encountered will be pushed up to the ground surface or to the side as they slide along the blade. There is no possibility of such an edge becoming clogged by such matter.

FIGURE 1 shows how the blade is tilted forward for entering the ground. FIGURES 2 and 3 show that at whatever depth the blade is located for cutting through the ground, the bottom of the blade is parallel to the ground surface and the upwardly extending ends of the blade incline backwardly. Thus, the forward movement of the top of the blade where it is attached to its mounting mechanism, results in the blade being pushed forwardly through the soil with a shearing action.

The mounting mechanism which will be described provides for raising and lowering the blade and tilting it to a desired angle.

The arch is supported by the lifting frame formed of the longitudinal beams 7 and 8 the rear ends of which are pivotally held by the bolts or pins 10 between the lugs 12 and 13 which are welded on to and thus are integral parts of the arch 2. The rear end of the frame is reinforced by the transverse member 15 the ends of which are welded to the longitudinal beams 7 and 8 to resist bending and twisting of the frame as it operates the arch. The rear ends of the beams 7 and 8 are bent downwardly to prevent interference between the arch and frame when the latter is in the raised position (see FIG. 1). These bent down ends are reinforced on their outer surfaces by plates 16 and 17 to give bolts 10 sufficient bearing length. The frame is completed by the cross shaft 18 to which the forward ends of the beams 7 and 8 are pivotally supported, and by the diagonal member 29 which is welded to the members 7, 8 and 15 and thus strengthens the frame.

Figure 5:
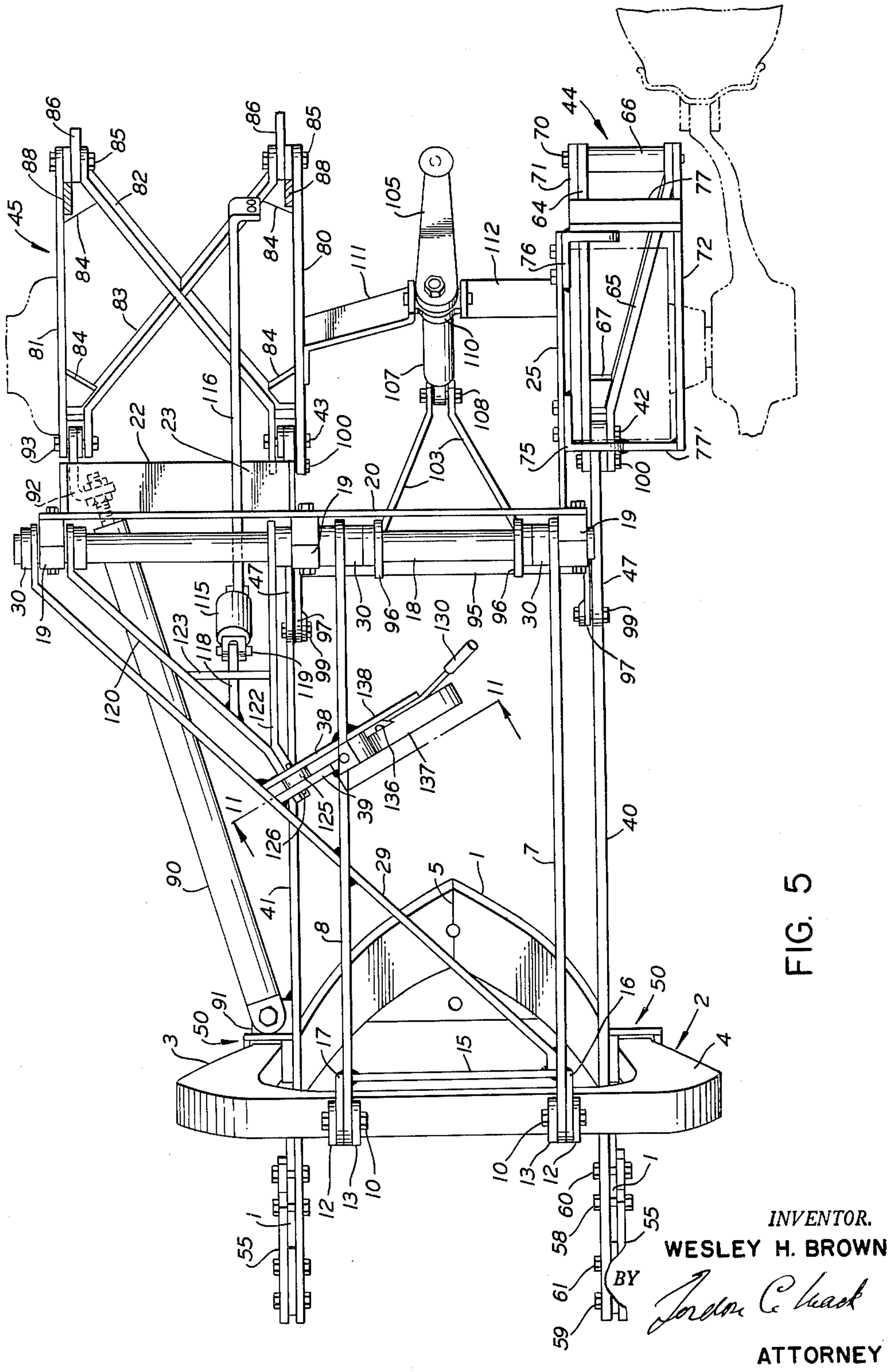
FIG. 5 is a plan view with the blade in its lowest position.
Figures 12, 13:
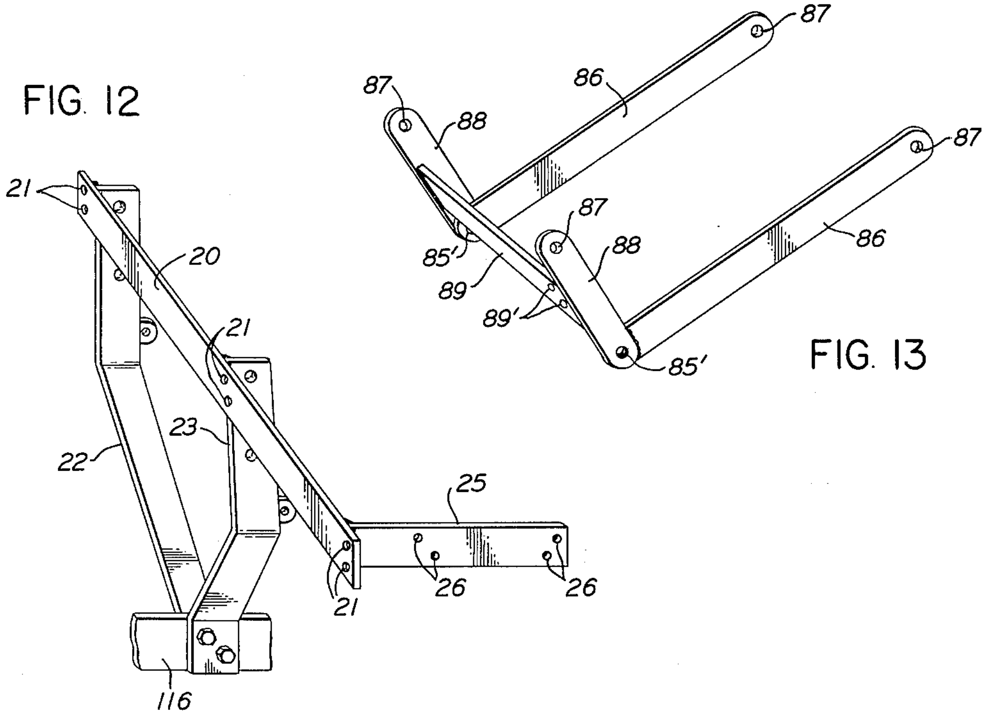
FIG. 12 is a detail in perspective of the support for the cross shaft.
FIG. 13 is a detail in perspective of the bracket for the inner draft link.

The cross shaft 18 is supported in the three bearings 19 which are bolted to the bearing support 20 which is fastened to the tractor. FIGURE 12 shows one way to attach the bearing support 20 to a tractor. The bearings 19 are bolted to the support 20 by means of the holes 21. The arms 22 and 23 of the yoke are bolted at their bottoms to the bracket 116 (FIGS. 5 and 12). The brace 25 is bolted by means of the holes 26 to the top of the wheel driving housing angles 75 and 76 (FIG. 18).

The front ends of the longitudinal members 7 and 8 and the diagonal member 29 are fitted with collars 30 which are held to cross shaft 18 by setscrews or driven pins. The rear end of this diagonal member 29 is welded to longitudinal member 7 and transverse member 15. Longitudinal member 8 and diagonal member 29 are notched vertically at their intersection (member 8 in its lower edge and member 29 in its upper edge, or vice versa) where they are fitted and welded together. Angular braces 38 and 39 (FIG. 5) extend between the diagonal member 29 and longitudinal member 8 and are welded to them. This frame construction provides exceptional rigidity and resistance to twisting forces.

At the sides of the digger, are the longitudinal beams 40 and 41 which are supported near their rears by the bottom ends of the arch. Their front ends are pivotally supported by pins 42 and 43 from outer and inner draft links 44 and 45 which will be described below. These points of support are ahead of the arch 2 so that when the arch is raised the blade 1 which is rigidly fastened to these longitudinal beams (as will be explained) has its point tipped downwardly as illustrated in FIG. 1. Each longitudinal beam may be in one piece or constructed of two flat upper and lower beams designated 40, 40′ and 41, 41′ in the drawings. The beams 40 and 40′ and the beams 41 and 41′ are welded together near their front ends. Each of these double beams has its greatest depth in the portion subject to the heaviest bending stresses imposed by the blade and resisted by the arch. The front ends of beams 40′ and 41′ bend upwardly to pins 42 and 43 to prevent interference between the beams and the lifting links 47 (described below) when the arch is raised, as illustrated in FIG. 1. Each of the beams extends a short distance to the rear of the arch. By bending the rear of each of the upper of these beams downwardly a few inches of the expensive blade is saved. The upper and lower beams on each side of the digger are welded together by plates 49 (FIG. 16).

Figure 14:
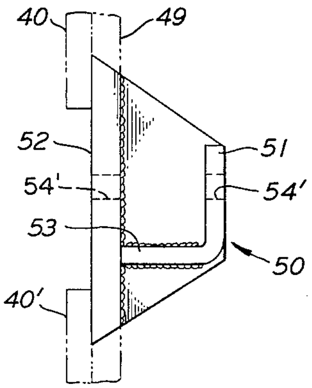
FIG. 14 is a rear view of one of the two brackets which connect the arch to the beams.
Figure 15:
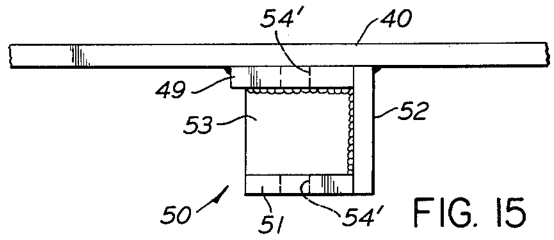
FIG. 15 is a plan view of this bracket.

A bracket 50 is pivotally supported from each leg of the arch and welded between the two portions of the longitudinal beams. FIGURES 14, 15 and 16 show details of the empty bracket on the right beam. The bracket 50 is formed from angle steel, the front leg 52 being beveled as shown in FIG. 14, and the lower end of the side leg 51 is bent up to form the bottom 53 which is welded to leg 52 and to plate 49. Front leg 52 is welded to the front edge of plate 49. The bottom of the arch is held pivotally in the bracket by the pin 54 (FIGS. 1, etc.) which passes through the holes 54′ (FIGS. 14, 15 and 16).

The vertically extending portions of the blade are held tight to the rear of the longitudinal beams 40, 40′ and 41, 41′ by the clamps 55 and 56 which are bolted in place by bolts 58, 59, 60 and 61. Any means for rigidly attaching the blade to the longitudinal beams may be employed. The blade may be located in front of the arch if desirable, but this reduces the lift of the blade. The angle at which the blade is held with respect to the ground level, G, is varied by raising and by lowering the front ends of the beams 40, 40′ and 41, 41′.

The outer draft link referred to above by the reference numeral 44 is necessarily relatively narrow. It is formed of the longitudinal member 64, the outwardly flaring member 65, and the sleeve 66 and wedge 67 welded to the forward and rear portions of these members to give them rigidity. The entire assembly is curved (FIGS. 2 and 3) to clear the tractor wheel-drive housing when in the raised position as shown in FIG. 3. The pin 70 which passes through the sleeve 66 (FIG. 5) is supported at its ends in holes 70′ by side members 71 and 72 (FIGS. 17 and 18) which are parts of a bracket assembly whose details vary with applications to different tractor models. The bracket is attached to the bearing support 20 by suitable means such as the plate 25 (FIG. 5) and angles 75 and 76 (FIGS. 17 and 18.) The bracket is reinforced by the angle 77 and the angled gusset 77′. The holes 78 (FIG. 18) are for fastening to the member 25, and holes 79 are for bolting the bracket to the tractor. The bolt 42 which passes through the rear of members 65 and 64 supports the forward end of the longitudinal beam 40′. These beams are only approximately ¾ inch thick. The ends have ¾ inch plates or washers welded to their outside surfaces, giving the bolt 42 increased bearing length.

Side members 71 and 72 with upstanding angles 75 and 76 and cross angle 77 and gusset 77′, welded together, form a box frame. The outer draft link 44 is pivoted within this frame by pin 70 and spacer sleeve 66.

The inner draft link identified above by the reference numeral 45 is composed of the parallel longitudinal plates 80 and 81 and the crossed reinforcing members 82 and 83. Wedges 84 in the four corners rigidify the link. The pin 43 which passes through the rear of members 80 and 82 supports the front of the longitudinal beam 41'.

The two front corners of the draft link 45 are pivotally attached by pins 85 below the tractor frame in holes 85' to suitable arms 86.

Figure 4:
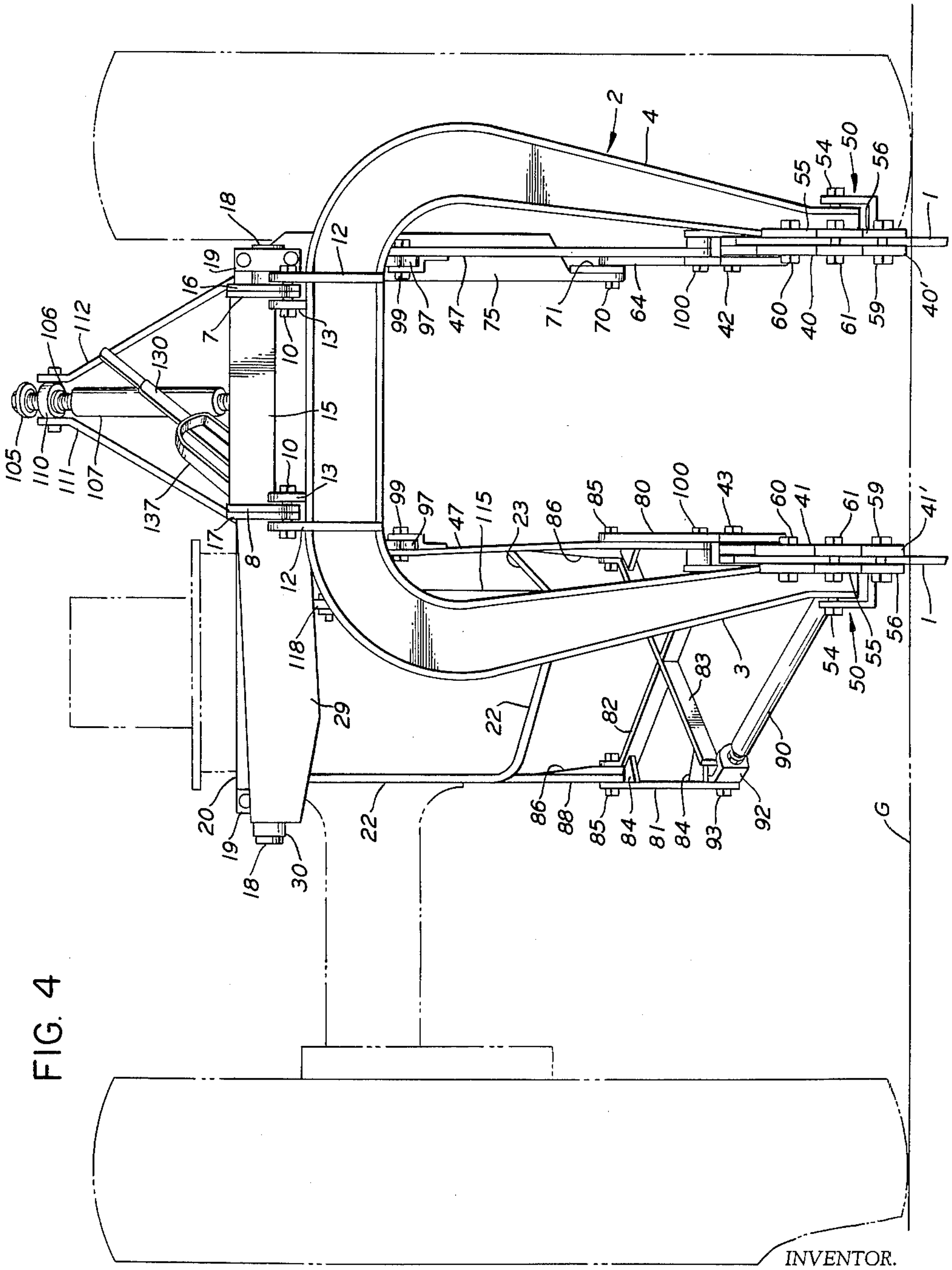
FIG. 4 is a rear view with the blade in its lowest position.

FIGURE 13 is a detail showing means for fastening this link to the body of the tractor. The holes 87 at the front of the arms 86 and at the top of the arms 88 receive bolts which are bolted to the tractor body. Arms 86 and 88 are welded together at almost a 90° angle. The front of the bracket 116 (FIG. 5) is attached through the two holes 89' in the brace 89 which spans the distance between the arms 88. One rear corner of the inner draft link is pivotally attached to the beam 41' and the other to brace 90 (FIGS. 4 and 5). Therefore the pivot axes of the beam and brace coincide regardless of the vertical position of the beam.

The brace 90 is for heavy work and is preferably tubular. It angles inwardly from the beam 41 immediately in front of the arch to the left rear corner of the inner draft link 45. The rear end is bolted to lug 91 (FIG. 5) on the bracket 50. The front end is hinged by the adjustable plate 92 to the pin 93 which passes through the rear end of the plates 81 and 83.

Figure 10:
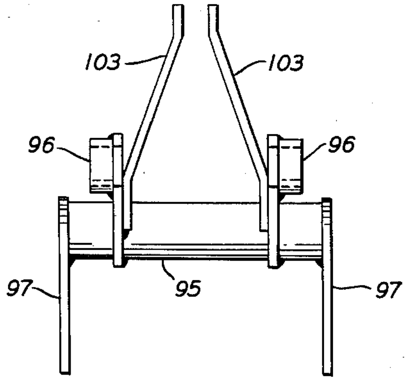
FIG. 10 is a plan view of the depth control rockshaft.

Below the cross shaft 18 is the preferably tubular depth-control rock shaft 95 (FIG. 10) which adjusts the angle of the blade 1. It is supported from the cross shaft 18 by arms 96. The arms 97 fastened to the ends of the rock shaft are pivoted to depth-adjusting links 47 by pins 99. These links are thickened at their lower ends to provide longer bearing surfaces for the bolts 100. Links 47 support the rear ends of the outer and inner draft links 44 and 45 by means of bolts 100.

The connecting arms 103 are welded or otherwise rigidly attached to the arms 96 and/or shaft 95, and it is by means of these arms 103 that the rock shaft is rotated about the axis of the cross shaft 18, and the fronts of the beams 40, 40' and 41, 41' are raised and lowered, thereby controlling the angle of the blade with respect to the arch. The depth to which the front ends of the beams are lowered is controlled by the crank 105 which turns the adjusting screw 106 inside of the threaded sleeve 107 the lower end of which is pivotally attached to the front end of the connecting arms 103 by the pin 108. The thrust bearing 110 through which the unthreaded upper end of the screw 106 passes, is trunnioned in brackets 111 and 112 which are attached to the tractor. Crank 105 being within easy reach of the tractor driver, it is seen that the depth which the blade reaches and its horizontal cutting position can be maintained from the driver's seat. When the tractor is equipped with a multiple-valve hydraulic system the crank, screw and sleeve may be replaced by a double-acting cylinder and hand-operated control valve.

The blade is raised and lowered by the hydraulic cylinder 115. This may be a single-acting cylinder with the piston rod attached directly to the lifting frame which supports the arch. However, it is preferable to use a double-acting cylinder, for reasons which will appear in what follows. The bottom of the cylinder is pivotally attached to the rear of the bracket 116 which is rigidly fastened to the tractor. The piston rod is attached to lug 118 by pin 119. This lug is welded to the lifting arm (FIG. 5) composed of the angular member 120, the longitudinal member 122, both pivotally supported at their front ends by cross shaft 18, and the cross member 123. All are welded together and move as a unit. The rear of the members 120 and 122 project through niches in the underside of the angular braces 38 and 39 (FIG. 11), but are not attached to them. As the cylinder 115 raises the arm 120, it lifts the arm 122 and together they lift the brace 38. By means of the lifting frame, the arch 2 and beams 40, 40' and 41, 41' the blade 1 is lifted. The members 120, 122 and 123 form only a lifting arm. This arm can exert no downward pressure on the blade. Consequently, when the blade is passing through the soil it "floats" and the horizontal bottom of the blade brings the vertical arms of the U to the angle at which the blade slides freely through the ground.

The hook 125 (FIG. 11) pivotally mounted on the pin 126 can be engaged under the elements 120, 122 of the lifting arm to pull the frame down whenever this is required, as when sub-soil points are used in lieu of the cutter blade 1. With the hook thus engaged, any downward movement of the piston rod is transmitted through the frame to the points or the like. Any suitable means may be employed for maintaining the hook 125 engaged with the arm. Thus, it is optional whether the frame and ground-penetrating means attached thereto are free floating or whether they are subject to positive depth control.

Figure 11:
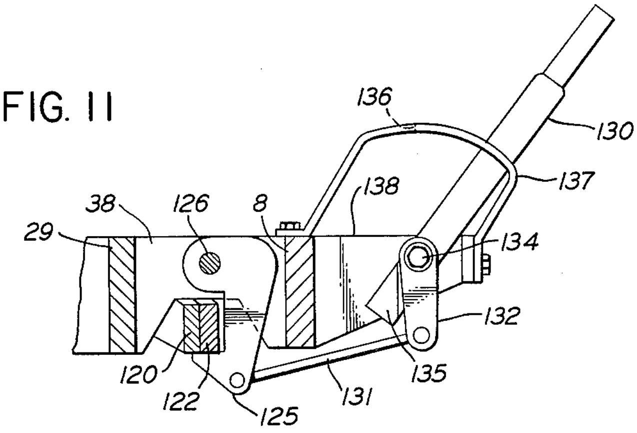
FIG. 11 is a broken sectional detail view taken on the line 11—11 of FIG. 5 of the hook and lever provided to allow the lifting frame to float.

The position of the hook 125 is controlled by lever 130 through the rod 131 and free arm 132. The arm 132 is pivoted on the lever stud 134. The lug 135 on the lower end of the lever contacts the arm 132 when the lever is moved toward the rear (which is to the left in FIG. 11). When moved to engage the arm 132 it drops into the notch 136 (best seen in FIG. 5) in the quadrant 137 which is supported by the bracket 138 (FIG. 11). It may be advantageous to provide a coil spring under tension between the hook 125 and the longitudinal member 8 so as to maintain the hook engaged with the arm 120 when the lever is disengaged from the notch and thrown to the opposite end of the quadrant, in the position shown in FIG. 11. The lever is not positively attached to the free arm 132 but makes contact only by the lug 135 so that if the hook is moved to the right (FIG. 11) by the rising lifting arm 120, 122 contacting its beveled lower end, the free arm will move to the right (FIG. 11) without moving the lever with it, and thus prevent injury to the operator should he have his hand on the lever when the hook is engaged.

Figure 19:
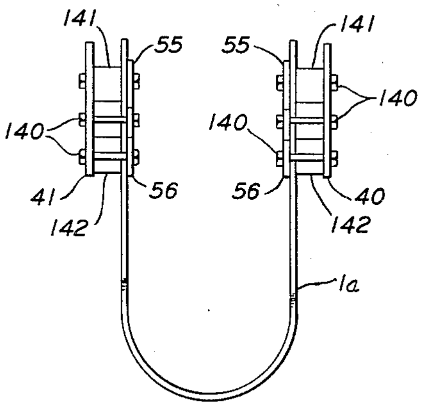
FIG. 19 is a front view of an alternative blade mounting.

FIGURE 19 shows means for attaching a narrower U-blade 1A to the beams 40, 40' and 41, 41', than the blade 1 shown in the prior views. The bolts 58, 59, 60 and 61 are replaced by longer bolts 140, and spacers 141 over the top bolts and spacers 142 over the lower bolts provide means for using blades of narrower width. These spacers may be made of thick metal as shown, or may be built up to the desired thickness by using the required number of blade clamps 55 and 56.

Figure 20:
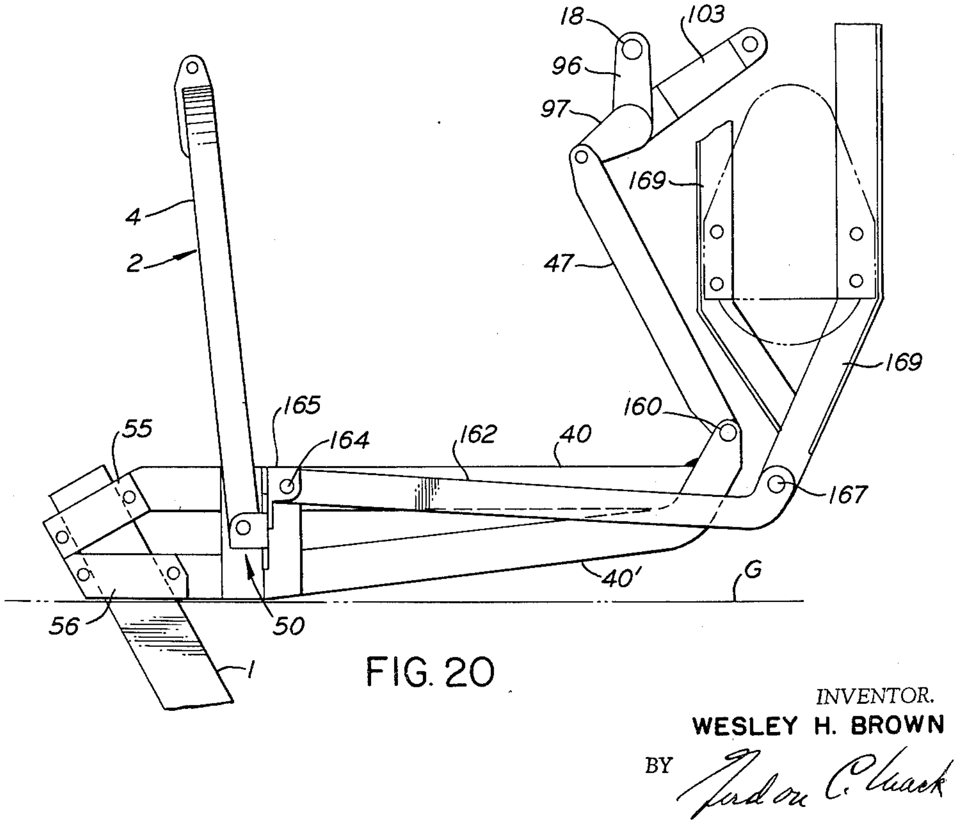
FIG. 20 shows alternative means for attaching depth adjusting links and draft links to beams when the tractor design does not readily permit the use of the short draft links of the previous views.

FIGURE 20 shows alternative means for supporting the front of the alternative beams 40, 40' and 41, 41' and the arch 2 when the design of the tractor does not permit the use of short draft links such as the links 44 and 45 of the prior views. In this construction, the fronts of the beams 40 and 41 are attached directly to the bottom of the draft adjusting links 47 by the pins 160. Thus the angle of the blade is adjusted as before. The draft (or pull) is applied to the beams through links 162 (one on each side of the digger) which are pivotally attached at their rear by pins 164 to brackets 165 which are welded or otherwise attached to or near the front of brackets 50. At the forward end the outer link 162 is pivoted by pin 167 to brackets 169 on the axle or drive-wheel housing. The inner link is attached to a bracket fixed to the body of the tractor by another pin whose axis coincides with that of the pin 167 for the outer link.

On some high-clearance tractors the clearance is obtained by means of extremely large wheel diameters without the necessity of driving the wheels through enclosed gears or chains. On such tractors the outer link draft bracket would be attached to the axle housing, and the inner link bracket to the body of the tractor.

Other modifications of the specific means disclosed may be made in a manner known to the man skilled in the art. The invention is covered by the claims which follow.

What I claim is:

1. In a digger for nursery stock adapted for attachment to a tractor,
a relatively vertical arch adapted to pass over the stock, the arch being pivotally supported adjacent its top by upper elongated support means the front ends of which are pivotally supported by
first means adapted to be rigidly attached to the tractor, the bottoms of the arch being pivotally supported by two lower elongated support means supported adjacent their front ends by
intermediate pivotal means adapted to be adjusted vertically with respect to said first means adapted to be attached to the tractor, and
means for the adjustment of the height of said intermediate pivotal means with respect to said first means adapted to be attached to the tractor,
said intermediate pivotal means being also pivotally supported with respect to second support means adapted to be rigidly attached to the tractor in front of said intermediate pivotal means, and
an inverted U-shaped digger blade rigidly attached to the lower elongated support means adjacent the rear end thereof.

2. The digger of claim 1 which includes expandible lifting means attached at its bottom to means adapted to be rigidly supported by the tractor with the upper end of the lifting means bearing against the underside of said upper elongated support means whereby the arch is adapted to be lifted.

3. The digger of claim 2 in which the upper end of said lifting means is adapted to be attached to the upper elongated support means whereby the arch can be lowered by contraction of the expandible lifting means.

4. The digger of claim 1 adapted to be attached to a tractor provided with two rear wheels and one front wheel located laterally between them, with the apparatus of claim 1 adapted to be locked to the rear of the tractor between the path of the front wheel and the path of one rear wheel of the tractor when the tractor moves in a straight line,
said upper support means comprising two substantially parallel elongated members spaced laterally with the outer one near but above said path of said rear wheel, and the inner one near but above said path of the front wheel,
a diagonal brace rigidly fastened to the outer upper support means adjacent the rear thereof, rigidly fastened to the inner upper support means and pivotally attached to the first means near the path of the front wheel when the tractor moves in a straight line,
one said intermediate pivotal means being near but above said path of said rear wheel, another said intermediate pivotal means being near but above said path of the front wheel, and third intermediate pivotal support means being near but above said path of the front wheel and on the opposite side thereof from the last-mentioned pivotal means, and adapted to be vertically adjusted with said other two intermediate pivotal support means,
one bottom of the arch being near but above said first-mentioned path of a rear wheel, the other bottom of the arch being near but above the path of the front wheel, and a diagonal brace attached at its rear end to said other bottom of the arch and at its front end pivotally attached to said third intermediate pivotal support means.

5. In a digger for nursery stock to be attached to a tractor with two rear wheels and one front wheel,
three pivotal supports aligned transversely of the digger, the first such support being near but above the path of a rear wheel, the second such support being near but above the path of the front wheel, and the third such support being near but above the path of the front wheel and on the opposite side thereof from said first such support, when the tractor moves in a straight line,
a relatively narrow link which comprises said first pivotal support toward the rear thereof and is adapted to be attached to one side of the tractor,
a double link which includes the second and third pivotal supports toward the rear thereof, and is adapted to be attached to the underside of the tractor,
a substantially vertical arch to the rear of the tractor,
inner and outer lower outer substantially parallel elongated supports which respectively are pivotally supported by the first and second pivotal supports and extend directly backward therefrom at least to the respective sides of the arch, and near the respective bottoms of the arch,
an inverted U-shaped digger blade rigidly attached adjacent the rear ends of said elongated supports which pivotally support the blade,
a third lower elongated support extending diagonally across from the aforesaid inner elongated support and rigidly attached thereto and pivotally supported at the third pivotal support,
a transverse shaft adapted to be attached to the tractor above said elongated supports,
two upper elongated supports substantially parallel to the efirst two of the aforesaid lower elongated supports with their front and rear ends pivotally supported, respectively, to said transverse shaft and adjacent the top of the arch,
a third upper elongated shaft extending diagonally across the upper elongated supports and rigidly attached thereto and at its forward end pivotally attached to said transverse shaft,
with means for raising the arch and for adjusting the angle of the blade with respect to the angle of the arch.

6. The digger of claim 5 which includes also means for lowering the arch.

References Cited in the file of this patent

UNITED STATES PATENTS

| | | |
|---|---|---|
| 1,190,055 | Wick | July 4, 1916 |
| 2,410,945 | Johnson et al. | Nov. 12, 1946 |
| 2,414,072 | Taft | Jan. 7, 1947 |
| 2,552,292 | Metz et al. | May 8, 1951 |
| 2,678,596 | Todd | May 18, 1954 |
| 2,703,044 | Adair | Mar. 1, 1955 |
| 2,770,076 | Kluckhohn | Nov. 13, 1956 |

FOREIGN PATENTS

| | | |
|---|---|---|
| 181,840 | Austria | Apr. 25, 1955 |